United States Patent [19]

Mojonnier

[11] Patent Number: 4,732,582
[45] Date of Patent: Mar. 22, 1988

[54] SCRUBBING APPARATUS

[76] Inventor: Harry G. Mojonnier, 1238 Franklin Ave., River Forest, Ill. 60305

[21] Appl. No.: 654,304

[22] Filed: Sep. 24, 1984

[51] Int. Cl.⁴ .............................................. B01D 53/14
[52] U.S. Cl. ........................................ 55/165; 55/227; 55/226; 55/229
[58] Field of Search ..................... 55/165–167, 55/226, 227, 196, 229, 233; 261/113, 110

[56] References Cited

U.S. PATENT DOCUMENTS

| | | | |
|---|---|---|---|
| 1,776,019 | 9/1930 | Elliott | 55/165 |
| 2,671,524 | 3/1954 | Gilwood | 55/165 X |
| 3,272,020 | 9/1964 | Witt et al. | 74/18.1 |
| 3,286,764 | 11/1966 | Mojonnier et al. | 159/44 |
| 3,574,987 | 4/1971 | Skoli et al. | 55/193 |
| 3,584,438 | 6/1971 | Skoli et al. | 55/193 |
| 3,741,552 | 6/1973 | Skoli et al. | 261/140 |
| 3,985,625 | 10/1976 | Bjerg | 261/113 X |
| 4,112,828 | 9/1978 | Mojonnier et al. | 99/275 |
| 4,216,711 | 8/1980 | Skoli et al. | 99/277.2 |
| 4,265,167 | 5/1981 | Mojoinner et al. | 55/166 X |
| 4,350,503 | 9/1982 | Skoli et al. | 55/165 |
| 4,352,682 | 10/1982 | Kemp et al. | 55/165 |
| 4,358,296 | 11/1982 | Notardonato et al. | 55/38 |

Primary Examiner—Charles Hart
Attorney, Agent, or Firm—Trexler, Bushnell, Giangiorgi & Blackstone, Ltd.

[57] ABSTRACT

A scrubbing apparatus comprises a gas-exchange column with a flow control system for removing extraneous gaseous matter from water. The flow control system includes an upper reservoir mounted above the column for receiving a supply of water to be passed through the column, a controllable valve responsive to predetermined control signals for regulating the flow of water to the upper reservoir, a level sensor in the upper reservoir responsive to the level of water therein for producing the predetermined control signals for the controllable valve in a predetermined systematic fashion in accordance with the water level, and a further adjustable orifice arrangement for delivering water from the upper reservoir to the column. The gas exchange column preferably comprises a plurality of foraminous sheets mounted in vertical array, each sheet including at least one enlarged through aperture; and the apertures of adjacent sheets in the vertical array being respectively offset.

14 Claims, 4 Drawing Figures

SCRUBBING APPARATUS

BACKGROUND OF THE INVENTION

This invention relates to a scrubber for removing extraneous gaseous matter from water and steam.

For example, in the beverage industry, it is desirable to remove extraneous gaseous matter (air and oxygen) from the water to thereby provide "deaerated" water. This is done to achieve stability of the beverage during preparation and during the filling process, as well as during storage prior to consumption.

Moreover, following the filling process, extraneous gaseous matter can promote premature deterioration and instability of the beverage within the can, bottle or aseptic package. Hence, scrubbing of the water utilized in beverage preparation can greatly increase the shelf life of the packaged product as well.

In the prior art, attempts were made to promote stability of the product by holding the pressure of the product at a relatively low level during preparation and filling. Primarily, cooling apparatus was utilized to maintain such pressure control and promote beverage stability. However, with the advent of modern containers and high-speed filling apparatus, higher pressures may safely be utilized to increase filling line efficiency. Accordingly, mere cooling of the water may be unnecessary or even undesirable in such installations.

In modern beverage operations, a proportioning unit is utilized to mix water with one or more "syrups" some containing natural fruit juice to produce the finished beverage. In the case of diet-type beverages, the syrup contains no sugar, and hence is very low in solid content, consisting primarily of water. Accordingly, water devoid of extraneous gaseous matter may advantageously be used in syrup preparation for these diet beverages as well.

While the prior art deaerating apparatus has been widely accepted in the beverage industry, there is room for further improvement. In particular, it is desirable to coordinate the flow of water through the deaerating apparatus with the deaerated water requirements of the downstream utilization apparatus, such as beverage mixing or proportioning and beverage filling apparatus. The demand for deaerated water may vary considerably during process operation. During startup and shutdown of a beverage preparation and filling line, a varying demand for deaerated water is experienced at the scrubbing apparatus.

Similarly, scrubbing of the water introduced to boiler apparatus is known to reduce corrosion and thereby extend equipment life, to reduce pipeline and equipment replacement costs and to lower overall maintenance. In this regard, it has been determined that dissolved oxygen and carbon dioxide in the boiler water can be up to 40% more corrosive than equal quantities of either gas alone, especially at the higher temperatures experienced in a boiler. Hence, scrubbing of the boiler water, and particularly of makeup water, to remove dissolved oxygen and carbon dioxide is beneficial. In this instance, steam may be used as the scrubbing gas.

The prior art has attempted to control the flow of water through the deaerating apparatus by sensing the level of deaerated water accumulated at a bottom portion or reservoir thereof and available for use by downstream apparatus. However, the deaerating apparatus usually comprises a relatively tall column, wherein the water to be deaerated is introduced at the top of the column and is passed down through deaerating apparatus, generally against a counterflow of stripping gas such as nitrogen or carbon dioxide (or steam in a boiler application). Hence, at any given point in the process, a relatively large volume of water is in the deaerating column. Accordingly, controlling the flow of water to the top of the column by sensing the level of deaerated water at the bottom results in a considerable amount of excess deaerated water being produced (i.e., that water which is already within the column) after the signal to shut down is received. The same will be seen to be true of any control signal derived from equipment downstream of the deaerating apparatus for controlling the inflow of water to the top or inlet thereof.

The prior art has also proposed flow control apparatus located upstream of the deaerator column or apparatus for metering and controlling the flow of water thereto. One such flow control device is shown, for example, in U.S. Pat. No. 4,350,503. However, this device also achieves control based primarily upon the level of water at the bottom of the deoxygenating or deaerating column, and moreover comprises a relatively complex and expensive additional piece of equipment.

OBJECTS AND SUMMARY OF THE INVENTION

Accordingly, it is a general object of the invention to provide a novel and improved scrubbing apparatus.

A more specific object is to provide scrubbing apparatus which is capable of surprisingly accurate control of the flow of water therethrough so as to coordinate the production of scrubbed water with the demand from downstream utilization apparatus without the need for expensive auxiliary flow control equipment.

A related object is to provide self-contained, packaged scrubbing apparatus in accordance with the foregoing objects which utilizes a simplified design to facilitate relatively simple, and preferably on-site, assembly to the specifications of a particular user.

A further object is to provide scrubbing apparatus in accordance with the foregoing objects which is relatively simple and inexpensive in its design and manufacture, and yet highly reliable in operation.

In accordance with one aspect of the invention, a scrubbing apparatus comprises a gas-exchange column for removing extraneous gaseous matter from water and a flow control system. The flow control system includes an upper reservoir mounted above the column for receiving a supply of water to be passed through the column, a controllable valve for controlling the flow of water to the reservoir, and an adjustable orifice arrangement for delivering water from the upper reservoir to the column.

In accordance with another aspect of the invention, the scrubbing column comprises a plurality of foraminous sheets mounted in vertical array, each sheet including at least one enlarged through aperture; and the apertures of adjacent sheets in the vertical array being respectively offset.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following detailed description of the illustrated embodiment taken in connection with the accompanying drawings in the several figures of which like reference numerals identify like elements, and in which:

DETAILED DESCRIPTION OF THE ILLUSTRATED EMBODIMENT

Figure 1:
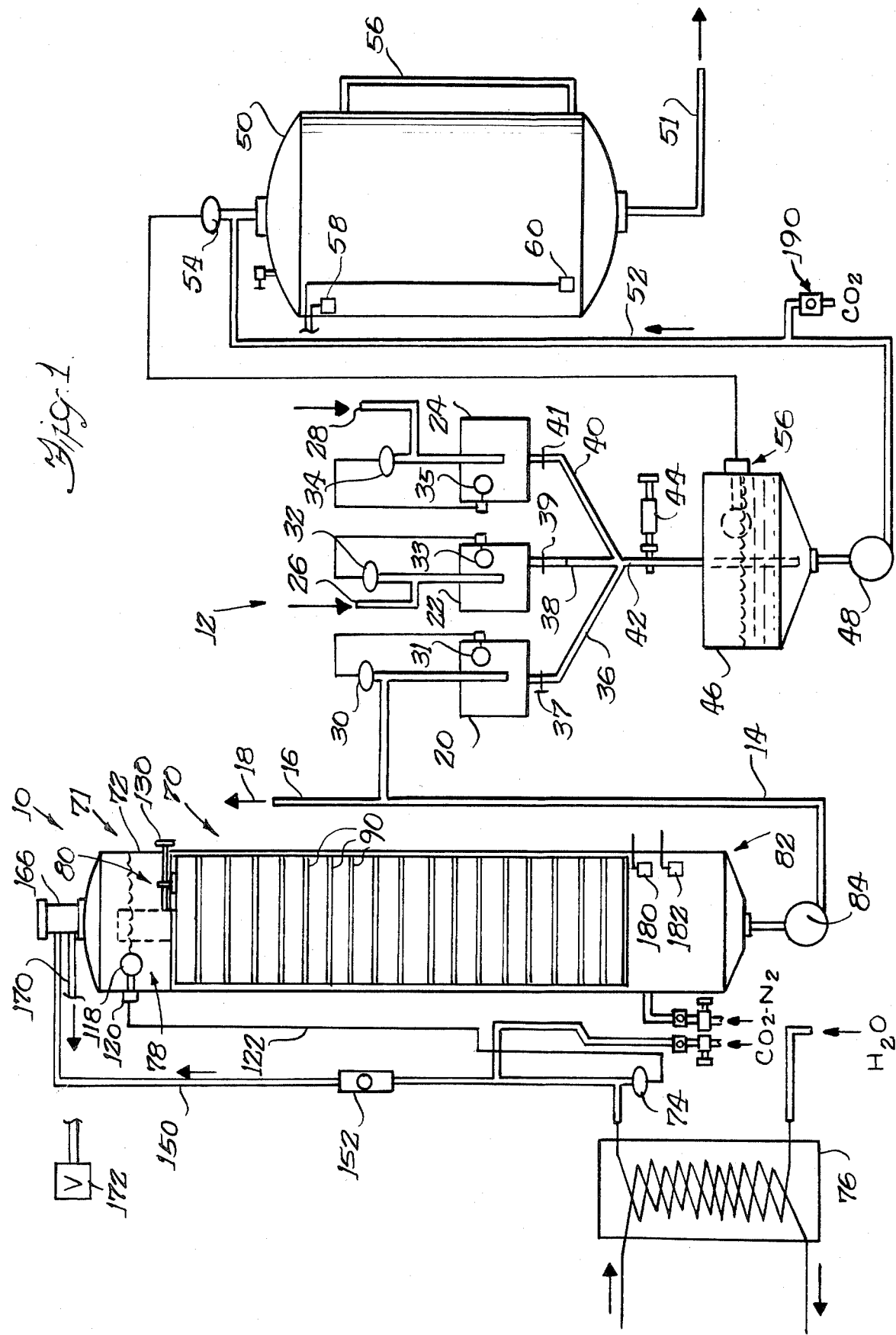
FIG. 1 is a diagrammatic illustration of a beverage processing system advantageously provided with scrubbing apparatus in accordance with the present invention.

Referring now to the drawings and initially to FIG. 1, a scrubbing apparatus in accordance with the invention is designated generally by the reference numeral 10. This scrubbing apparatus is shown in FIG. 1 in conjunction with a beverage processing system. However, it will be understood that the scrubbing apparatus 10 may be utilized in other applications, for example in providing scrubbed boiler water or scrubbed water for a brewing process, without departing from the invention.

In the embodiment illustrated FIG. 1, the scrubbing apparatus 10 feeds deaerated or deoxygenated water to downstream beverage processing equipment including a proportioner designated generally by the reference numeral 12 by way of an outlet line 14. An additional branch line 16 from the outlet line 14 may feed other downstream equipment as indicated generally by arrow 18. Such downstream equipment may include further proportioner units such as the apparatus 12 or other equipment such as syrup preparation equipment, in another location. Briefly, such syrup preparation, especially in the case of diet drinks, utilizes a relatively large proportion of water. (It may be desirable to provide scrubbed water for this process with a separate scrubber, similar to scrubber 10, in the syrup preparation area.)

The proportioner 12 may be of a type generally known in the art, as shown for example in U.S. Pat. No. 3,237,808, and need not be described in detail herein. Suffice it to say that the proportioner 12 includes a plurality of reservoirs 20, 22 and 24 for receiving respectively deaerated water from the line 14 and one or more other ingredients such as syrup, natural fruit juice or the like, from additional inlet lines 26 and 28. Each of these lines is preferably equipped with a suitable inlet control valve diagrammatically represented at 30, 32 and 34, respectively. These control valves 30, 32 and 34 receive control inputs, preferably from level-sensing floats 31, 33 and 35 for controlling the flow of respective ingredients to the respective inlet reservoirs 20, 22 and 24. These inlet reservoirs feed respective conduits or standpipes 36, 38 and 40 which may further be provided with a control valve 37 and disc orifices 39, 41, respectively. Standpipes 36, 38, 40 then join together at a single outlet conduit or pipe 42, which is preferably provided with a flow control member or valve 44. This outlet conduit 42 feeds an outlet reservoir 46.

A pump 48 delivers the finished or proportioned product to a finished product holding tank 50 by way of a conduit 52. Preferably, a further valve 54 is provided for controlling the flow of finished product into the tank 50. A float member 56 positioned in the proportioner outlet reservoir 46 may be utilized to control the valve 54, thus matching the flow of finished product into the tank 50 with the supply and hence flow of finished product to the reservoir 46. Preferably, each of the valves 30, 32, 34 and 54 is a pneumatic or air-controlled valve and may be of the type shown in U.S. Pat. No. 3,260,504.

The finished product tank 50 is provided with a level gauge 56 for viewing the level of product therein. Additionally, respective upper and lower level probes 58, 60 are provided in the finished product tank for control of the overall process. In this regard, the probes 58 and 60 preferably energize electrical control means (not shown) for controlling the supply or flow of pressurized air to operate the pneumatic or air-controlled valves 30, 32, 34 and 54. Hence, when the level in the tank 50 is relatively low, that is, below the probe 60, pressurized air will be provided for operation of all of the valves to run the process so as to achieve filling of the tank 50. On the other hand, when the level of the product in tank 50 is relatively high so as to reach the probe 58, the supply of pressurized air will be interrupted to, in effect, shut down the process and prevent the further production of finished product and introduction thereof to the tank 50.

Referring now more particularly to the scrubbing apparatus 10 according to the invention, this apparatus preferably includes a gas-exchange scrubber column designated generally by reference numeral 70 for removing extraneous gaseous matter from water. In accordance with a feature of the invention, a novel flow control means or apparatus, shown in FIGS. 2 and 3 designated generally by reference numeral 71, is provided for controlling the flow of water to the column 70.

This flow control apparatus 71 includes a reservoir 72 and a pilot air float valve 78 which controls a controllable valve means 74. The reservoir 72 is mounted above the column 70 for receiving a supply of water to be passed through the column. The valve 74 regulates the flow of water to the upper reservoir 72. In this regard, the valve 74 receives a supply of water from an inlet ($H_2O$). In the illustrated embodiment, a cooling apparatus 76 is also shown. This cooling apparatus may optionally be provided in installations where it is desired that the water utilized be cooled in addition to deaerated. However, in most installations, such cooling apparatus 76 will not be required, and hence this apparatus forms no part of the invention.

Returning to discussion of the scrubbing apparatus 10, and particularly the flow control apparatus 71, the upper reservoir 72 is further provided with a level sensor or sensing means, preferably in the form of the above mentioned pilot air float valve 78. This sensor 78 is responsive to the level of water in the upper reservoir for producing predetermined control signals for controlling the valve 74 in a predetermined and systematic fashion in accordance with the water level in reservoir 72. In the illustrated embodiment, the sensor 78 produces a control signal corresponding to the level of water in the upper reservoir 72 for automatically controlling the flow of water thereto at the valve 74. Finally, an adjustable orifice means 80 is provided for delivering a supply of water from the upper reservoir 72 to the scrubbing column 70.

In the illustrated embodiment, a lower reservoir designated generally by the reference numeral 82 is also mounted below the column 70 for receiving scrubbed water therefrom. A pump 84 is provided for pumping scrubbed water from the lower reservoir 82 to the downstream utilization apparatus by way of the previously mentioned pipe or conduit 14.

Referring now to the remaining drawings, it will be seen that the scrubbing column 70 comprises a plurality of similar, vertically arrayed sheets or trays 90. Each sheet 90 preferably comprises a generally circular, flat sheet-like foraminous member, and may be formed of metal or other suitable materials. Small foramines or perforations 92 extend over the surface of the sheet 90. Preferably, the peripheral edge of each sheet 90 extends to the outer wall 94 of the column when the sheets are mounted in vertical array as illustrated. Located at predetermined locations in each sheet 90 are one or more larger (compared to perforations 92) through apertures 96. Preferably, each of these through apertures 96 is provided with a raised peripheral lip portion or rim 98. In the illustrated embodiment, these apertures 96 are four in number; however, more or fewer such apertures may be utilized without departing from the invention.

Figure 2:
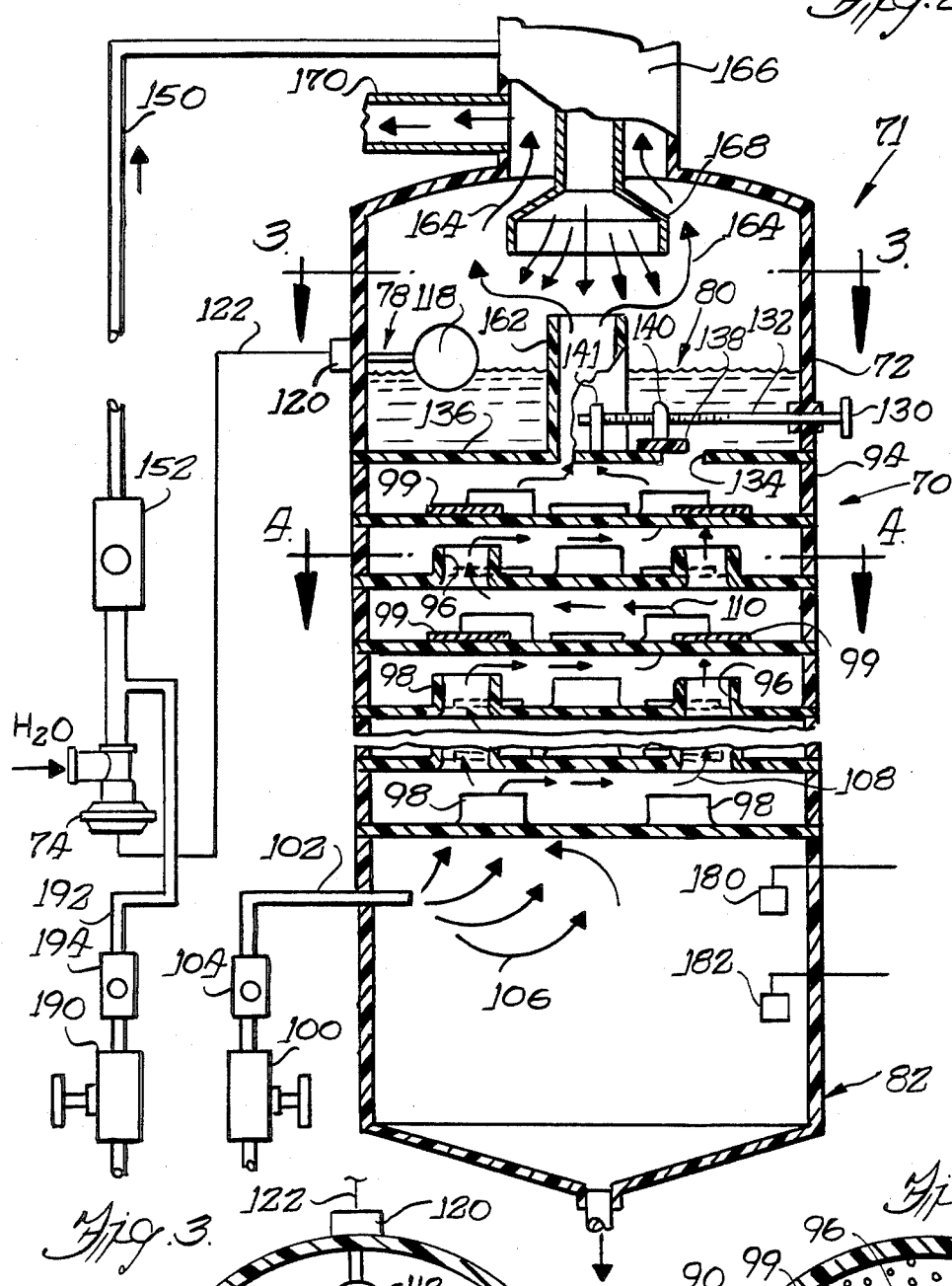
FIG. 2 is an elevational view, partially broken away and partially in section, illustrating further details of a flow control portion of the scrubbing apparatus of the present invention.
Figure 3:
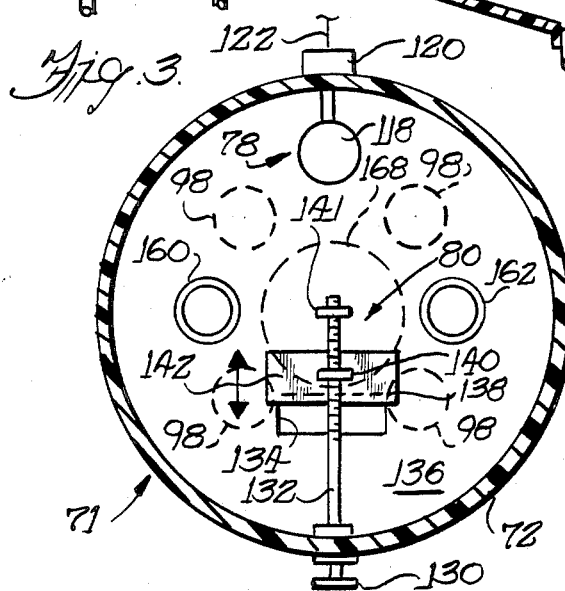
FIG. 3 is a sectional view taken generally in the plane of the line 3—3 of FIG. 2.

As previously mentioned, the sheets 90 are stacked or mounted the in vertical array, and in generally parallel, horizontally disposed condition as illustrated in FIG. 2. Advantageously, each of these sheets or trays 90 is offset or rotated with respect to the next adjacent sheets or trays so as to offset, or locate the respective through apertures 96 of the adjacent sheets or trays out of alignment with each other. In the illustrated embodiment the relative offset or rotation or displacement is on the order of 45 degrees.

Optionally, a plurality of small non-foraminous sheet members or baffles 99 may be utilized intermediate the through apertures 96 to cover a portion of the foraminous sheet 90 which will be in alignment with the through apertures 96 of the adjacent sheets 90. This may be done, if desired, to eliminate any flow of water through the through apertures 96, and limit the flow entirely to the relatively small foramines or perforations 92. Hence, these non-foraminous sheets or baffles, which preferably comprise solid disc-like bodies, are equally spaced intermediate through apertures 96 and preferably displaced angularly by substantially 45 degrees therefrom with reference to the 360 degree circle defined by circular sheet 90.

A supply of suitable stripping gas such as carbon dioxide ($CO_2$) or nitrogen ($N_2$) or steam is introduced by suitable means such as a valve 100 to a bottom portion of the column 70. In the illustrated embodiment, the valve 100 feeds a conduit or pipe 102 by way of a flow meter 104. This conduit 102 extends through an upper sidewall portion of the bottom reservoir 82. Hence, the stripping gas passes upwardly through the column 70 as indicated generally by arrows 106 and into a circuitous path to exchange the stripping gas for extraneous gases previously dissolved in the water flowing downwardly through the deoxygenating column. In this regard, the water will be noted to drip generally downwardly through the foraminous sheets 90. As indicated above, the stripping gas flows in a generally circuitous fashion, as shown by further arrows 108, 110 through the water droplets intermediate respective sheets 90, and up through the apertures 96 of each sheet to the next sheet thereabove. It will be noted that the optional non-foraminous or disc-like members 99 of each sheet above the respective apertures 96 of the sheet therebelow also tend to direct the stripping gas back toward the apertures 96 of the sheet above as indicated by arrows 110, upon passing through the apertures 96 of the sheet below.

In the embodiment shown for purposes of illustration, the sensor 78 in the upper reservoir 72 includes a float member 118 and a signalling means in the form of a pneumatic or air pilot control valve unit 120. This unit 120 is coupled with the float 118 for producing pneumatic or air control signals corresponding to the level of the float and comprising the predetermined control signals previously mentioned for controlling operation of the valve 74. In this regard, the float 118 and signalling unit 120 may be of the type generally shown in U.S. Pat. No. 3,272,020.

As previously indicated, the valve 74 is responsive to control signals from the signalling means 120 corresponding to the level of the float 118 and hence of the water within reservoir 72 for controlling or modulating the flow of water to the upper reservoir 72. Similarly, the valve 74 is responsive to control signals from the signalling means 120 corresponding to levels of the float 118 other than the maximum level for regulating the flow of water to the upper reservoir generally as a function of the level of the float 118 and hence of the level of the water in the reservoir 72. Advantageously, this arrangement will be seen to assure a supply of water at all times for the column 70 immediately which essentially matches the demand of the column 70.

Figure 4:
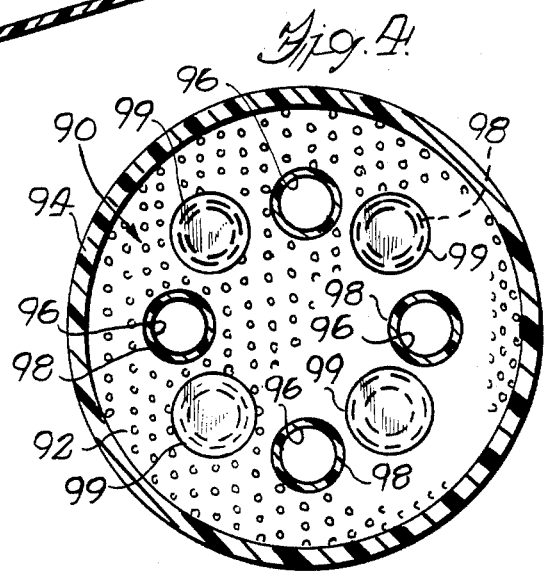
FIG. 4 is a sectional view taken generally in the plane of the line 4-4 of FIG. 2.

In accordance with a further aspect of the invention, the adjustable orifice means 80 intermediate the upper reservoir 72 the column 70 comprises an orifice, the size of which may be adjusted by an operator to a desired size member. This adjustable orifice is best viewed in FIGS. 3 and 4. To this end, the adjustable orifice includes an adjustment means or member 130 which extends externally of the apparatus at upper reservoir 72 for adjusting the rate of flow of water from the upper reservoir to column 70. In this regard, the adjustment member 130 will be seen to be coupled to an elongate threaded rod-like member 132 which extends into the upper reservoir 72 and in particular extends over an opening 134 provided in a bottom wall 136 of the upper reservoir. Hence, the adjustable orifice means includes this opening 134 in bottom wall 136, as well as a cover member 138 therefor. This cover 138 is mounted to slide along bottom wall 136 relative to the opening 134 between a position where the opening is unobstructed by the cover member and a position where the opening is totally obstructed by the cover member. As will be seen presently, the cover may also be moved to any desired intermediate position for selectively restricting opening 134.

In this regard, the cover member is provided with an internally threaded member 140 coupled therewith and engaged with the externally threaded elongate member 132. This engagement permits bidirectional longitudinal movement of member 140 along member 132, as indicated by arrow 142, in response to corresponding bidirectional rotation of the elongate member 132 by means of the protruding knob or adjustment member 130. A bearing or mounting bracket 141 may be provided for rotatably receiving the opposite end of elongate threaded member 132. Hence, the cover member 138 will be seen to be movable through the above-mentioned substantially continuous range of intermediate positions by rotation of the member 130. This, in turn, will be seen to provide control or regulation of the flow rate of water from the upper reservoir 72 to the scrubbing column 70.

In the illustrated embodiment, the adjustment member or knob 130 is preferably manually adjusted by an operator, although other automatic adjustment means may be provided if desired without departing from the invention. It will also be noted that the valve 74 controls the flow of water to a top portion of the upper reservoir 72 by way of a conduit 150 which is provided with a flow meter 152 therein. Accordingly, an operator may adjust the knob or flow control member 130 to achieve a desired rate of flow of water through the column 70 by observing the flow meter 152 as the member 130 is adjusted. In this regard, it will be remembered that the flow through conduit 150 is regulated by valve 74 in response to the demand in the upper reservoir 72 as sensed by the pilot float valve 78. However, it will be further recognized that this demand is in turn determined by the setting or adjustment of the member 130 for controlling the flow to the column 70 therebelow. Accordingly, observation of flow meter 152 may be utilized to set a particular desired rate of flow of water to and through the column 70.

Advantageously, the flow as adjusted by member 130, meets the downstream demand of the proportioner and/or other equipment on the outlet lines or conduits 14, 16. This will, in turn, match the flow rate to the filling equipment downstream of finished product tank 50. In this regard, it will be recognized that an outlet conduit 51 of finished product tank 50 preferably feeds finished product to filling equipment downstream thereof. Hence, the finished product tank, by means of probes 58 and 60 as previously described, matches the downstream filling equipment demand, while the proportioner 12 matches the demand of the finished product tank 50 as previously described.

In turn, the above-described apparatus of the invention, including the controllable or adjustable valve means 80 and 74, matches the flow of water through the column 70 to the demand at the inlet 30 of the proportioner 12. Advantageously then, it will be seen that the flow through the deaerating apparatus 10 of the invention is simply and yet accurately matched to the flow or demand of downstream equipment throughout the system by the provision of the adjustable orifice 80 and controllable valve means 74, as described above.

In the preferred embodiment illustrated herein, the upper reservoir further includes a pair of exhaust ports 160, 162 in communication with an upper end of the column for exhausting stripping gas therefrom. In this regard, remaining gas may exit these exhaust ports 160 and 162 as indicated generally by arrows 164 and proceed into an upper manifold member 166 which preferably surrounds a water inlet manifold member 168 coupled to the conduit 150. An outlet conduit 170 coupled with manifold 166 is preferably coupled at an opposite end thereof to a vacuum means or vacuum equipment for operating the column 70 at a negative pressure. Operation of the column 70 under a negative pressure or vacuum enhances the efficiency of the column in substituting the stripping gas for extraneous gases dissolved in the water.

In the illustrated embodiment, the lower reservoir 82 is additionally provided with respective upper level and lower level probe members 180 and 182 which are substantially similar to the probes 58 and 60 previously described with respect to the finished product tank 50. These latter probes 180 and 182 are preferably electric sensors and produce predetermined startup and shutdown signals for the air supply to the controllable valve 74 and/or air control system including pilot float valve 78 and its signalling means or air pilot valve 120. Hence, when the water in reservoir is at or below lower probe 182, indicating startup of the system, the valve 74 is supplied with pressurized air to open so as to deliver water to upper reservoir 72 under control of the pilot float valve 78, as previously mentioned. However, when water in the lower reservoir reaches a predetermined upper level as sensed by probe 180, a shutdown signal is produced for removing the pressurized air supply from the system including valve 120. This will shut down valve 74, stopping the delivery of water to upper reservoir 72. This upper level probe 180 of the lower reservoir 82 might be reached, for example, in the event of shutdown of downstream equipment, and a corresponding cessation of demand for scrubbed water.

In the illustrated embodiment, it will be further noted that the stripping gas, such as carbon dioxide or nitrogen, may also be supplied to the water inlet conduit 150 by means of a suitable valve 190, a coupling conduit 192 and a flow meter 194. This so-called concurrent flow of stripping gas is believed to further enhance the efficiency of the scrubbing process. Additional carbon dioxide gas may also be introduced into the finished product in conduit 52 en route to the finished product tank 50, as indicated generally at 190.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A scrubbing apparatus comprising: a gas-exchange scrubbing column for removing extraneous gaseous matter from water; and flow control means comprising an upper reservoir mounted above said scrubbing column for receiving a supply of water to be passed through said column, controllable valve means for regulating the flow of water to said upper reservoir, level sensing means in said upper reservoir responsive to the level of water therein for producing predetermined control signals in a predetermined systematic fashion in accordance with said level, said controllable valve means being responsive to said predetermined control signal for regulating the flow of water to said upper reservoir, and adjustable orifice means intermediate said upper reservoir and said column for delivering water from said upper reservoir to said column; sthe level of water in said upper reservoir set by said level sensing means cooperating with said adjustable orifice means to control the rate flow of water to the scrubbing column therebelow; wherein said adjustable orifice means is interposed between said upper reservoir and said scrubbing column and is adjustable for adjusting the rate of flow of water from said upper reservoir to said column and includes adjustment means extending externally of said scrubbing apparatus.

2. Apparatus according to claim 1 wherein said scrubbing column comprises a plurality of foraminous sheets mounted in vertical array, each said sheet including at least one enlarged through aperture; and the apertures of adjacent sheets in said vertical array being respectively offset.

3. Apparatus according to claim 1 wherein said level sensing means comprises float means in said upper reservoir and signalling means coupled to said float means for producing signals corresponding to the level thereof and comprising said predetermined control signals.

4. Apparatus according to claim 3 wherein said valve means is responsive to a control signal corresponding to the level of said float means for controlling the flow of water to said upper reservoir.

5. Apparatus according to claim 4 wherein said valve means is responsive to said predetermined control signals for regulating the flow of water to said upper reservoir generally as a function of said level of said float means.

6. Apparatus according to claim 1 wherein said upper reservoir includes a bottom wall portion located immediately above said column and wherein said adjustable orifice means comprises an a through opening in said bottom wall portion, a cover member, and mounting means for mounting said cover member for slidable movement along said bottom wall and relative to said opening between a position wherein said opening is unobstructed by said cover member and a position wherein said opening is totally restricting by said cover member and through a substantially continuous range of intermediate positions for partially obstructing said opening.

7. Apparatus according to claim 6 wherein said mounting means comprises an elongate externally threaded member extending over said opening and a complimentary internally threaded member coupled with said cover member and engaged with the externally threaded member for bidirectional longitudinal movement therealong in response to bidirectional rotation of said elongate member, said externally extending adjustment means being operatively coupled for selectively bidirectionally rotating said elongate member.

8. Apparatus according to claim 1 and further including means for introducing a stripping gas to a bottom portion of said column so as to flow generally upwardly therethrough and exchange said stripping gas for said extraneous gaseous matter previously dissolved in the water flowing therethrough.

9. Apparatus according to claim 8 wherein said upper reservoir further includes exhaust port means in communication with an upper end of said column for exhausting any remaining stripping gas therefrom.

10. Apparatus according to claim 1 and further including a lower reservoir mounted below said scrubbing column for receiving scrubbed water therefrom.

11. Apparatus according to claim 10 and further including pump means at a bottom portion of said lower reservoir for delivering scrubbed water to further utilization apparatus.

12. Apparatus according to claim 1 wherein said controllable valve means is further responsive to predetermined startup and shutdown control signals for respectively starting or stopping the flow of water to said column; and further including level sensing means in said lower reservoir for producing said predetermined startup and shutdown signals in a predetermined systematic fashion in accordance with the level of water in said lower reservoir.

13. Apparatus according to claim 1 and further including vacuum-creating means operatively coupled with said column for operating said column at a negative pressure.

14. Apparatus according to claim 2, said sheet further including baffle means offset from said at least one through aperture for alignment with the through apertures of adjacent sheets in said vertical array.

* * * * *

UNITED STATES PATENT AND TRADEMARK OFFICE
CERTIFICATE OF CORRECTION

PATENT NO. : 4,732,582

DATED : March 22, 1988

INVENTOR(S) : Mojonnier

It is certified that error appears in the above-identified patent and that said Letters Patent is hereby corrected as shown below:

Column 9, line 32, "restricting" should read --obstructed--;
line 32, "obstructing" should read --restricting--.

Column 6, line 32, before "the column", insert --and--;
line 34, after "size", delete "member".

Signed and Sealed this

Twentieth Day of December, 1988

Attest:

DONALD J. QUIGG

*Attesting Officer*              *Commissioner of Patents and Trademarks*